Jan. 30, 1962     D. J. GONZALEZ     3,018,844
ELECTROSTATIC PRECIPITATOR

Filed Feb. 3, 1960     2 Sheets-Sheet 1

INVENTOR.
DON J. GONZALEZ
BY
Ralph B. Brick
ATTORNEY

Jan. 30, 1962  D. J. GONZALEZ  3,018,844
ELECTROSTATIC PRECIPITATOR
Filed Feb. 3, 1960  2 Sheets-Sheet 2

INVENTOR.
DON J. GONZALEZ
BY
Ralph G. Brick
ATTORNEY

United States Patent Office 3,018,844
Patented Jan. 30, 1962

3,018,844
ELECTROSTATIC PRECIPITATOR
Don J. Gonzalez, Valley Station, Ky., assignor to American Air Filter Company, Inc., Louisville, Ky., a corporation of Delaware
Filed Feb. 3, 1960, Ser. No. 6,544
5 Claims. (Cl. 183—7)

This invention relates to electrostatic precipitators and more particularly to an improved plate electrode assembly for electrostatic precipitators.

In accordance with the present invention, an improved plate electrode assembly is provided which serves to insure effective electrical contact between certain select parts of the assembly to reduce possible problems of arc-over and which, at the same time, serves to strengthen the several plates of the assembly. The present invention obtains these features without sacrificing any desirable features of past electrode assemblies, the present invention further providing an assembly which is economical in construction and which can be assembled rapidly and efficiently with a minimum of operating steps and with few materials.

Various other features of the present invention will become obvious to one skilled in the art upon reading the disclosure set forth hereinafter.

More particularly, the present invention provides a plate electrode assembly for an electrostatic precipitator comprising a plurality of plates spaced from each other a predetermined distance, the plates having openings therein of preselected contour, spacer bar means of cross-sectional contour conforming substantially to the contour of the openings to permit passage of such spacer bar means through the openings, the spacer bar means having sets of slots extending transverse the longitudinal axis thereof with the slots of each set being spaced from each other substantially the same distance as the plates, the slots being of sufficient depth and breadth to permit rotation of the spacer bar means about the longitudinal axis from one position to another when the spacer bar means has been passed through the plate openings and the slots are aligned with the plates wherein the plates engage in the slots to be maintained in spaced relation, and means to offset the engagement of the plates with one set of slots slightly from the engagement of such plates with corresponding slots of an adjacent slot set to effect a firm plate-in-slot engagement and a preselected curvature of the plates.

It is to be understood that various changes can be made in the arrangement, form and construction of the several parts of the assembly disclosed herein without departing from the scope or spirit of the present invention.

Referring to the drawings which disclose one advantageous embodiment of the present invention:

Figure 5:
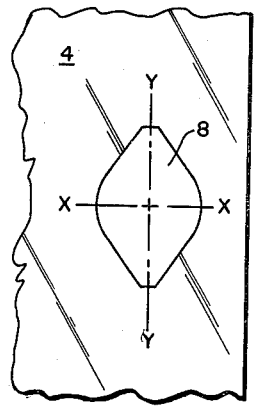
FIGURE 5 is an enlarged side elevation of a portion of one plate, disclosing an opening in the plate with which a spacer bar like that of FIGURES 3 and 4 cooperates.
Figure 6:
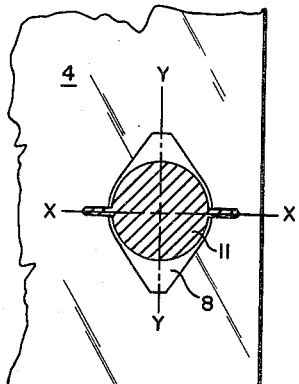
FIGURE 6 is an enlarged side elevation of a portion of a plate similar to that of FIGURE 5, further disclosing a cross-section of a spacer bar after it has been inserted into the opening of the plate and rotated into operational position.
Figure 10:
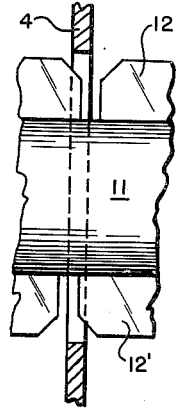
Figure 7:
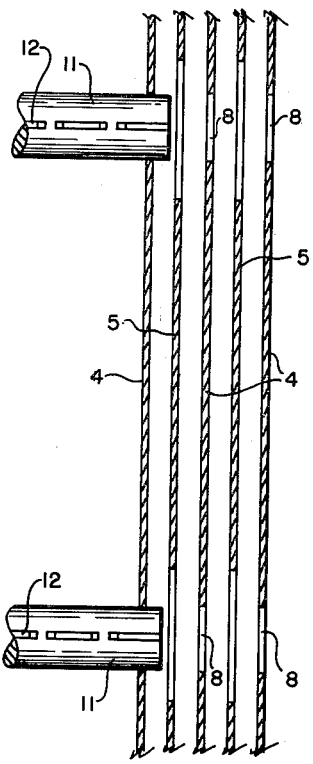
Figure 8:
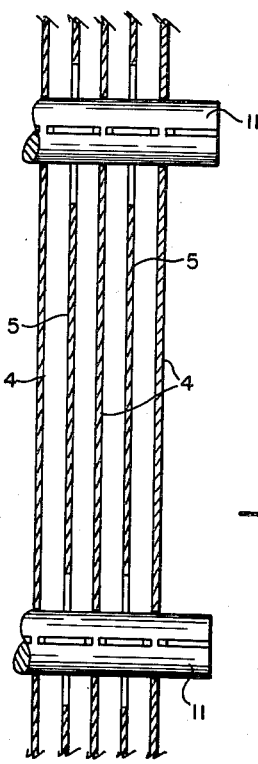
Figure 9:
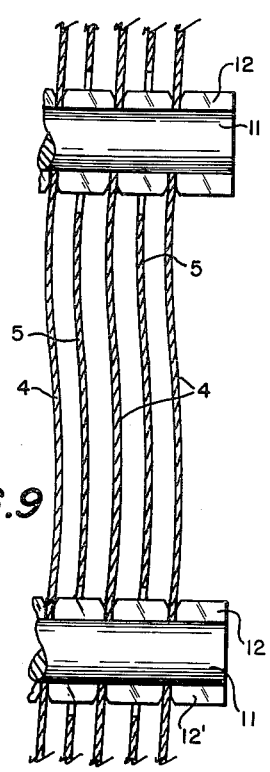

FIGURES 7 through 9 are a series of enlarged, schematic, partial plan views, disclosing in progression the steps involved in assembling the plates and spacer bars of the electrode assemblies of FIGURES 1–6, the curvature of the plates being somewhat exaggerated to bring out more clearly the present invention; and, FIGURE 10 is an enlarged view of a portion of a spacer bar and plate to further disclose the offset slot arrangement.

Figure 1:
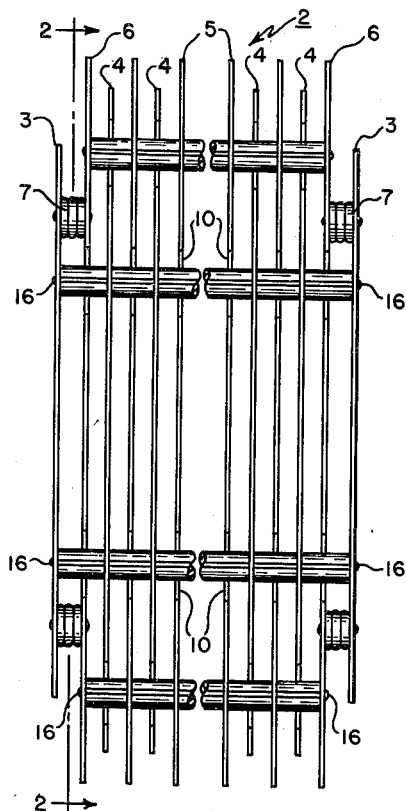
FIGURE 1 is a partial face elevation of a plate electrode assembly arrangement which embodies the present invention.
Figure 2:
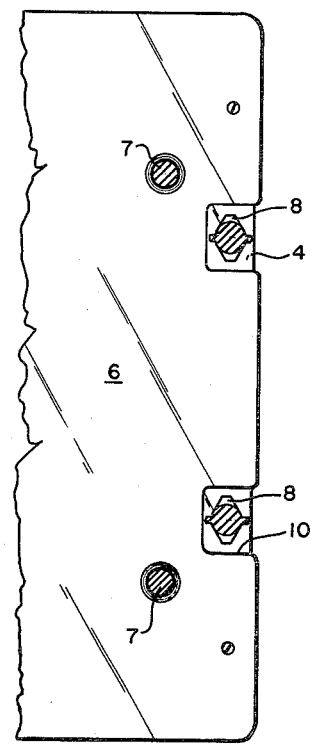
FIGURE 2 is a partial side elevation taken in a plane passing through line 2—2 of FIGURE 1.

Referring to FIGURES 1 and 2 of the drawings, plate assembly 2, which embodies the present invention, includes charged end plates 3 from which are supported, intermediate thereto, the charged plates 4. The charged plates 4 are arranged in spaced, parallel relationship to each other and have positioned, in alternate arrangement therewith, the spaced parallel grounded electrode plates 5. Plates 5 are supported from grounded end plates 6 which, in turn, are attached to the housing of the precipitator (not shown) and which support end plates 3 by means of insulators 7.

The principal features of the present invention are incorporated in a structure utilized for supporting the intermediate electrode plate arrangements from their respective end plates. As can be seen particularly in FIGURES 1, 2, 5 and 6, each electrode plate 4 is provided with support openings therein. It is to be understood that in one advantageous embodiment of the invention, four or more of such openings can be provided in each plate. The plates 4 are loaded in a jig for proper parallel spacing and for proper alignment of corresponding support openings. It is to be noted that each of the support openings in the advantageous embodiment of the invention disclosed is of substantially elliptical contour (as indicated in FIGURES 5 and 6), the major axis Y—Y of the ellipse extending in a vertical direction along the plate and the minor axis X—X extending in a horizontal direction.

Figure 4:
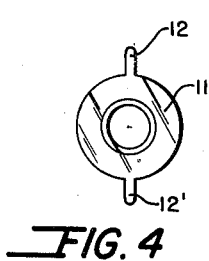
FIGURE 4 is an end view of the spacer bar of FIGURE 3.
Figure 3:
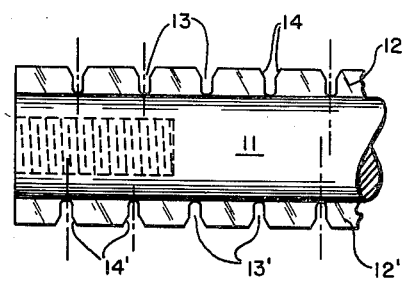
FIGURE 3 is a side view of a portion of a spacer bar of the present invention including fin members attached thereto, the fin members having sets of transverse slots running along opposite sides of the longitudinal axis of the bar, the slots of one set being offset from the slots of the other in accordance with the present invention.

Once the plates 4 are properly set in a jig, spacer bar members 11 are inserted through the aligned sets of openings 8. As can be seen in FIGURES 3, 4 and 6 of the drawings, spacer bars 11 are of a cross-sectional contour conforming substantially to the contour of the support openings 8, providing limited tolerance therebetween when passed through the openings after being properly oriented in alignment with such openings. In this connection, it is to be noted that spacer bars 11 can be of substantially circular cross-sectional contour of a diameter conforming to the minor axes X—X of the openings 8. Spacer bar members 11, each of which is substantially alike, are each provided with fin portions 12 and 12' which extend from diametrically opposite sides of that portion of the spacer bar of circular cross-sectional contour, the distance between the extremities of fins 12 and 12' being slightly less than the distance along the major axis Y—Y of the elliptical opening 8. Sets of slots 13 and 13' are provided in fin portions 12, 12' respectively so as to extend transverse the longitudinal axis of spacer bar member 11 on opposite sides thereof. The slots in each set 13 and 13' are spaced from each other a preselected distance which distance is substantially the same as the distance that the plates 4 are spaced from each other in a jig during plate electrode assembly (as will be seen hereinafter). It is to be noted that slots 13, 13' are of sufficient depth and breadth to permit rotation of spacer bar 11 about its longitudinal axis from one position to another when the spacer bar has been passed through plate openings 8 of plates 4 and the slots are in proper alignment with the plates. In this connection, it also is to be noted that the slots of set 13 in fins 12 are offset slightly from the corresponding slots of set 13' in fins 12', attention being directed to the broken center lines through slots of sets 13 and 13' as set forth in FIGURE 3 of the drawings. It further is to be noted that the slots of sets 13 and 13' are each provided with flared openings as at 14 and 14', respectively. The flared opening of each slot of sets 13 being of sufficient breadth so as to be in overlapping alignment with the opening of the corresponding slots of set 13', which set is on the opposite side of the longitudinal axis of the spacer bar member 11.

With the arrangement described, it is possible to hold the electrode plates of an assembly in properly spaced relationship, lock the assembly into desired position and, at the same time, establish a preselected curvature in the plates so as to impart additional strength to such plates. It is to be noted that the limited tolerance provided between spacer bars 11 and openings 8, as abovementioned, avoids accurate machine requirements and permits ready assembly of the several parts of the overall structure without requiring precise jig alignment. It is to be understood that the spacer bars can be cast, rolled, or press formed and, in some instances, can be extruded advantageously from some suitable material such as aluminum.

Referring to FIGURES 7 through 9 of the drawings, the several steps of assembling the plates are disclosed in detail. In assembly, plates 4 are supported in a jig (not shown) in spaced relationship to each other with the corresponding support openings 8 in alignment, the spacing between plates being the same as the spacing of the transverse slots in sets 13 and 13' of spacer bars 11. Bars 11 are then inserted through the openings 8, the bars being oriented so that the fin portions 12 and 12' are in alignment with the major axes y—y of the openings 8. When each of the sets of slots 13 and 13' of each bar is opposite its matching plate 4, the bar is turned about its longitudinal axis through a 90° angle so that the plates engage in the sets of corresponding slots 13 and 13'. In this connection, and as aforestated, it will be noted that the sets of corresponding slots 13 and 13' are of sufficient depth and breadth to permit this action—the slots being flared as at 14 and 14' to insure such turning and to facilitate the operation. Since spacer bars 11 for plates 4 are alike and since the slots of set 13 in fin 12 are slightly offset from the corresponding slots of set 13' in fin 12' of each of spacer bar members 11, when the bar members are each turned through a corresponding 90° angle, the plates 4 are caused to conform with these offset corresponding slots in the bars. As a result, a predetermined curvature is set up in each of the plates with the curvature of one plate being substantially identical to the curvature of an adjacent plate so that the plates remain substantially equal distance apart along their entire plane despite such preselected curvature. Further this effected predetermined curvature brought about as a result of offset corresponding slots serves not only to strengthen each of the plates 4 but, in addition, insures that the plates 4 effect a tight engagement in the sets of slots 13 and 13' so as to provide an effective electrical contact during electrical precipitating operation.

To fasten the assembly to end plates 3, the spacer bars 11 are tapped at their extremities to receive cap screws 16 which hold the spacer bars to plates 3. With the spacer bars properly in position in the assembly, the plates in the assembly are spaced correctly and cannot be changed until the spacer bars 11 are unfastened from end plates 3, turned 90° and withdrawn from the plate openings.

It is to be noted that when inserting spacer bars 11 into openings 8 of plates 4, provision is made in the form of cutaways 10 in grounded plates 5 and 6 (FIGURES 1 and 2) to permit such assembly and provide proper electrical clearance when necessary. It further is to be noted that grounded plates 5 and 6 can be provided with spacer bar arrangements similar to that provided for charged plates 3 and 4 and that charged plates 3 and 4 can, in turn, be provided with cutaways 10 to permit proper insertion and clearance of the spacer bars of the grounded plates.

The invention claimed is:

1. A plate electrode assembly for an electrostatic precipitator comprising a plurality of plates spaced from each other a predetermined distance, said plates having openings therein of preselected contour and spacer bar means of cross-sectional contour conforming substantially to the contour of said openings to permit passage of said spacer bar means through said openings, said spacer bar means having sets of corresponding slots with the side walls of said slots extending normally transverse the longitudinal axis of said spacer bar means with the slots of each set being spaced from each other substantially the same distance as said plate, said slots being of sufficient depth and breadth to permit rotation of said spacer bar means about the longitudinal axis from one position to another when said spacer bar means has been passed through said plate openings and said slots are aligned with said plates wherein said plates engage in said slots to be maintained in spaced relation, the slots of one set being offset slightly from the corresponding slots of an adjacent set to effect a firm plate-in-slot engagement and a preselected curvature of said plates.

2. The apparatus of claim 1, said slots including flared entrances to insure ready engagement of said slots with said plates.

3. A plate electrode assembly for an electrostatic precipitator comprising a plurality of plates spaced from each other a predetermined distance, said plates having openings therein of preselected contour and spacer bar means of cross-sectional contour conforming substantially to the contour of said openings to permit passage of said spacer bar means through said openings, said spacer bar means including spaced bar members each having sets of corresponding slots with the side walls of said slots extending normally transverse to and on opposite sides of the longitudinal axis thereof with the slots of each set being spaced from each other substantially the same distance as said plates, said slots being of sufficient depth and breadth to permit rotation of each of said bar members about its axis from one position to another when said bar member has been passed through said plate openings and said slots are aligned with said plates wherein said plates engage in said slots to be maintained in spaced relation, the slots of one set on one side of the longitudinal axis of each bar member being offset slightly from the corresponding slots of the set on the opposite side of such longitudinal axis to effect a firm plate-in-slot engagement and a preselected curvature of said plates between spaced bar members.

4. The apparatus of claim 3, the slots of at least one set of slots on one side of the longitudinal axis of each bar member including flared entrances, each of which extends parallel said longitudinal axis of said bar member a sufficient distance to fall in overlapping alignment with the corresponding slot on the opposite side of said longitudinal axis.

5. A plate electrode assembly for an electrostatic precipitator comprising a plurality of plates spaced from each other a predetermined distance, said plates having openings therein of preselected contour, spacer bar means of cross-sectional contour conforming substantially to the contour of said openings to permit passage of said spacer bar means through said openings, said spacer bar means having sets of corresponding slots with the side wall of said slots extending normally transverse the longitudinal axis of said spacer bar means with the slots of each set being spaced from each other substantially the same distance as said plates, said slots being of sufficient depth and breadth to permit rotation of said spacer bar means about the longitudinal axis from one position to another when said spacer bar means has been passed through said plate openings and said slots are aligned with said plates wherein said plates engage in said slots to be maintained in spaced relation, the engagement of the plates with one set of slot side walls being offset slightly from the engagement of such plates with corresponding slot side walls of an adjacent slot set to effect a firm plate-in-slot engagement and a preselected curvature of said plates.

References Cited in the file of this patent

UNITED STATES PATENTS

| | | |
|---|---|---|
| 1,563,709 | Jacobson | Dec. 1, 1925 |
| 2,642,952 | Landgraf | June 23, 1953 |

FOREIGN PATENTS

| | | |
|---|---|---|
| 749,290 | France | May 2, 1932 |
| 773,867 | France | Sept. 10, 1934 |
| 385,508 | Great Britain | Dec. 29, 1932 |
| 893,555 | Germany | Oct. 15, 1953 |